United States Patent [19]

Polatnick

[11] Patent Number: 4,791,489

[45] Date of Patent: Dec. 13, 1988

[54] GENERAL PURPOSE VIDEO SPECIAL EFFECTS SYSTEM AND METHOD THEREFOR

[76] Inventor: Michael Polatnick, P.O. Box 20026, Oakland, Calif. 94620

[21] Appl. No.: 22,391

[22] Filed: Mar. 6, 1987

[51] Int. Cl.$^4$ .............................................. H04N 5/14
[52] U.S. Cl. ...................................... 358/160; 358/22; 358/183
[58] Field of Search .......................... 358/22, 160, 183

[56] References Cited

U.S. PATENT DOCUMENTS

| | | | |
|---|---|---|---|
| 4,266,242 | 5/1981 | McCoy | 358/22 |
| 4,353,092 | 10/1982 | Bailey et al. | 358/160 |
| 4,652,906 | 3/1987 | Baugh | 358/22 |
| 4,694,343 | 9/1987 | Flora | 358/22 |
| 4,694,344 | 9/1987 | Flora | 358/22 |

*Primary Examiner*—James J. Groody
*Assistant Examiner*—Michael D. Parker
*Attorney, Agent, or Firm*—Flehr, Hohbach, Test, Albritton & Herbert

[57] ABSTRACT

A general purpose video special effects system and method is provided which utilizes at least one video rate RAM which has stored in it pre-computed data which is stored at addresses determined by all possible values of the video inputs to be utilized. Each special effect has a pre-computation which is accomplished by a threaded interpretive code technique operating on a parameter stack to facilitate the speed of computation. By the use of more than one video rate RAM, the effect may be changed on a line-by-line basis or even faster. Special effects are stored using a "composition of functions" technique that allows the same special effect to be pre-computed for changing bit widths or positions of input and output channels. Special effects can be built by using or combining functions provided. New functions can be defined by the operator by composition of standard or previously created functions.

16 Claims, 10 Drawing Sheets

| MODULE # | 0 | 1 | 2 | 3 | 4 |
|---|---|---|---|---|---|
| INPUT 1 FROM: | — | — | 0 | 0 | 3 |
| INPUT 2 FROM: | — | — | 1 | 1 | — |
| INPUT 3 FROM: | — | — | — | 2 | — |
| FUNCTION | CAM 1 | CAM 2 | MAX (MIN) | SOFT-KEY | MON-ITOR |

FIG.—4

LINEAR THREADED SEQUENCE
OF SUBROUTINE CALLS:

CAM 1
CAM 2
CAM 1
CAM 2
MAX
SOFT-KEY
MONITOR
RETURN

GENERAL PURPOSE VIDEO SPECIAL EFFECTS SYSTEM AND METHOD THEREFOR

BACKGROUND OF THE INVENTION

The present invention relates to a general purpose video special effects system and method therefor.

Most video special effect systems using a video random access memory (RAM) are cumbersome and difficult to organize for any out of the ordinary special effects. For example, a typical special effect is a "paint by numbers" scheme where a frame buffer is used. Here the images are limited to computer produced art work such as drawings, bar graphs, pie charts, etc. A color look up table is utilized. Such a system available on a single integrated circuit chip is produced by Inmos Corporation under Model IMS G170.

Most prior systems make no provision for passing video signals through the effects device at a full video rate in real time. They allow only the output of computer drawn imagery as discussed above or a single snapped frame from a video camera. Those that do have the ability to pass real time digital video are limited to, for example, one type of predetermined special effect. In any case, it is cumbersome and difficult for the operator to organize another special effect. Examples of the foregoing are illustrated in U.S. Pat. Nos. 4,266,242 to McCoy and 4,353,092 to Bailey.

Dan Sandin disclosed another technique with his "Image Processor," a patch programmable analog image processing synthesizer which implemented a variety of video processing functions in physical hardware modules. See the publication "Dream Machines" published by Computer Lib. in 1974. All of these modules were discrete analog devices which were connected together like a "Moog" type music synthesizer.

Bill Etra, with Steve Rutt, developed the Rutt-Etra video synthesizer. This device allowed alteration of video images by processing applied to the video in and X and Y deflection of a precision CRT which was then rescanned by a video camera. Etra, with Don Day, developed the Video Modular System. This system provided a modular approach to digital processing hardware and included software written by Day to control the processing of the real time image.

Steina and Woody Vasulka, working with Jeffrey Schier, demonstrated real time processing of digital video through dedicated logic hardware (arithmetic and logic units) and frame buffers with special programmable address generators. This system did rotation and other special effects. Both the Etra and Vasulka concepts are discussed in general in a 1984 Paris publication by CINE-MBXA/CINEDOC entitled "STEINA ET WOODY VASULKA: VIDEASTES." See also "Afterimage" Vol. 11, No. 5, Dec. 1983 published by Visual Studies Workshop of Rochester, N.Y.

OBJECTS AND SUMMARY OF THE INVENTION

It is an object of the present invention to provide a general purpose video special effects system and method therefor which is flexible, çan create a multiplicity of video effects on a substantially online basis and which is not limited by associated hardware.

It is another object of the invention to provide a special effects method in which the capabilities inherent in modern video rate processing hardware that have heretofore been inaccessible or cumbersome to organize can now be effectively managed by a single operator.

It is another object of the present invention to provide a development system for treating video special effects based on a building block "composition of functions" model.

It is another object of the present invention to allow a special effect to be designed independent of the bit widths or assignments of input and output channels.

It is another object of the present invention to provide a means for an operator to develop new special effects functions.

In accordance with the above objects, there is provided a general purpose special effects system and method using a random access memory (RAM) means in combination with one or more input sources with at least one being a video source, and with at least one video output destination. The method comprises the steps of providing a plurality of processing modules each having a predetermined function and connecting these modules in accordance with their associated functions to provide a composition of functions which determines the special effect. Next, connections are specified representing signal flow between the input sources and processing modules and the output destinations and processing modules. Special effects are pre-computed for substantially all possible values of permutation of the input sources. These permutations are stored in the RAM at addresses determined by the values of the input sources. Finally, the input sources are allowed to drive the addressed inputs of the RAM and read out the stored pre-computation contents of the RAM in real time to the video output destination.

DESCRIPTION OF PREFERRED EMBODIMENTS

Figure 1:
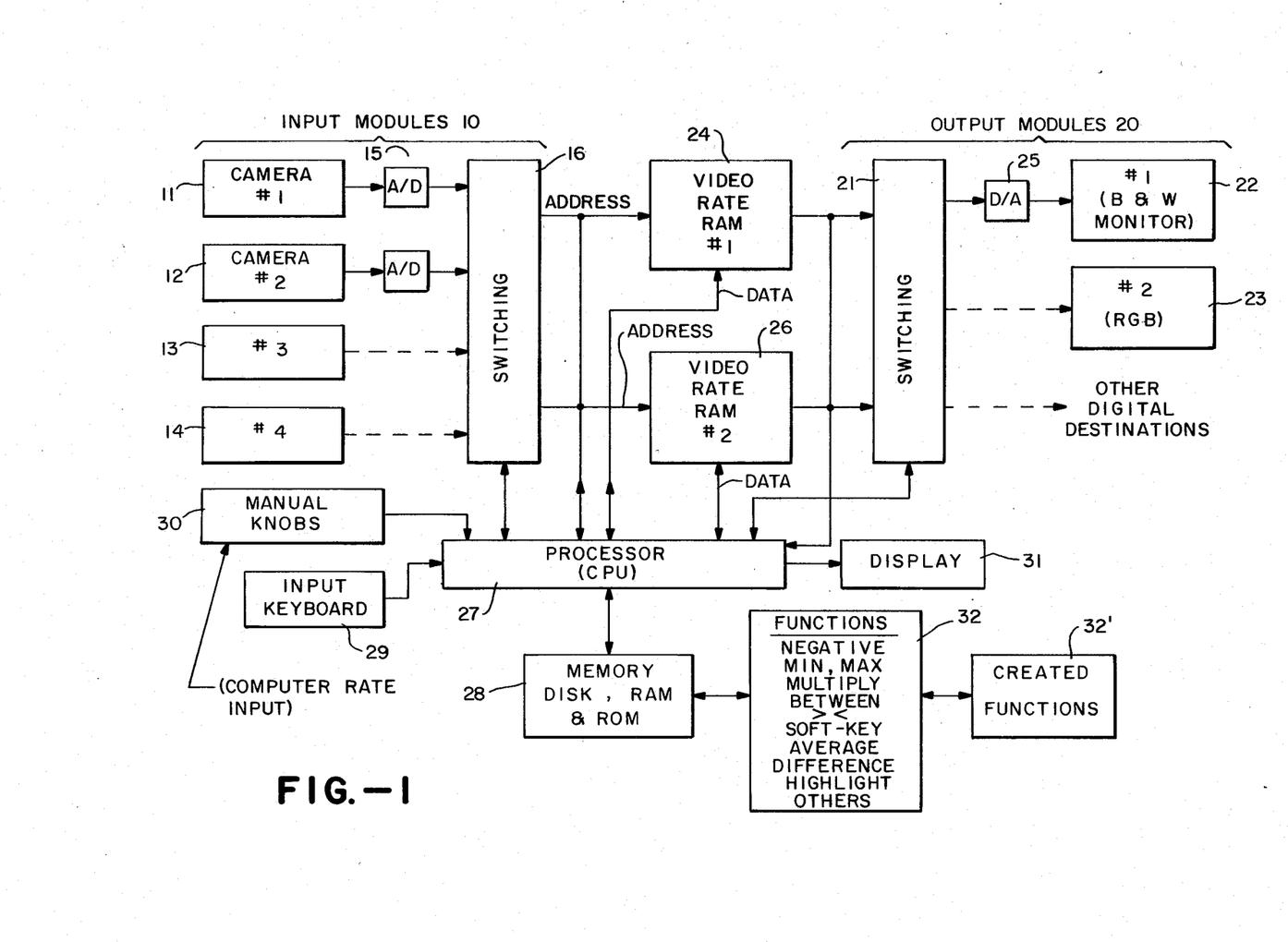
FIG. 1 is a block diagram of a system embodying the present invention.

FIG. 1 shows an overall block diagram of the apparatus used in the present invention. The input modules 10 will accept several video inputs, manually controlled inputs and other, either digital or analog, inputs which are to be manipulated by the special effects technique of the present invention to provide one or more video outputs. Thus the input modules include several different inputs, 11, 12, 13 and 14, in combination with a switching unit 16 and analog to digital (A/D) converters 15. Specifically, the various input sources for the present invention may include video cameras 11 and 12 designated camera number one and camera number two, which may be either black or white or color, or other specialized cameras having either an analog or digital output. However, typically the cameras would have an analog output with the typical white level indicating a maximum signal and black, a lack of signal. In any case, the above sources are video rate inputs.

In addition, a different type of input source 30 (connected via CPU 27) might include manually adjustable control knobs or another type of computer rate input. This type of input allows the signal from a lower speed (non video rate) instrument that is interfaced at the system's computer such as a control knob, joy stick, or signal from another computer or instrument to control video rate processing. Use of this device may be accomplished on-line or during the pre-computation period to be discussed below.

Output modules 20 include a switching device 21 to switch the various parallel inputs and reassign them, on any bit assignment basis, to an output. They also include a D/A converter 25, which connects to the final video destination. In this case, this destination is illustrated as a black and white monitor 22 or alternatively a monitor 23 which individually accepts red, green and blue inputs.

In general, it is apparent that many possible input sources can be effectively utilized. Analog sources such as video cameras which require analog-to-digital converters also might include video tape, film to video transfer, pattern or special effects generator, and other analog video signals or analog signals in general. Then original digital sources may be utilized also, including frame buffers, frame synchronizers, digital delays, pattern or special effects generator, output channels of other copies of the invention, computer outputs, and any other digital video or ordinary digital signal source. Other output destinations from a video standpoint could be a video tape unit, video to film transfer unit, a video switcher or any other analog video or ordinary analog equipment. Direct digital destinations (which do not require a digital-to-analog converter) might include a frame buffer, frame synchronizer, digital delay line on a pixel, line or frame basis, input channels of other copies of the invention, a computer, and other digital or digital video equipment.

Interfacing input modules 10 and output modules 20, are one or more video rate RAMs 24 and 26. Such RAMs are designated video rate since they will accept pixel data (or as illustrated, address information) and provide an output data stream to the output switching unit 21 at a rate which is determined from the size, in pixels, in x and y directions (256×256, 512×512, 1024×768, or NTSC standard, etc.) and the number of frames per second required. This rate, which at 1986 technological levels requires performance in the 10 MHz to 100 MHz range, determines the speed of the RAMs that must be used. Typically, a fast static RAM is used. However, one familiar with the art can easily see alternate implementations using dynamic RAMs, or static column dynamic RAMs, or other semiconductor devices.

This video rate far exceeds the rate at which a computer could respond to the input signals presented and execute the required composition of functions which will be discussed in detail below. Thus, a technique is provided, as will be explained, for effectively executing the composition of functions and its associated threaded code at video rates.

As RAM technology improves with regard to speed and density, as it has been doing historically at a tremendous rate, the composition of functions can be run on new hardware at higher performance levels.

As should be obvious to one skilled in the art, the same methodology used to load a video rate RAM can be applied to other, more special purpose, programmable hardware units whose control spaces have been organized into a group of hardware control registers arranged in an address space.

Such a hardware unit's control address space could be considered to be a RAM and its contents could be pre-computed based on a composition of relevant functions once any necessary new function modules appropriate to the control or interface to such hardware had been added to the system.

As illustrated in the preferred embodiment of FIG. 1, the address inputs of RAMs 24 and 26 are connected to the input module switching unit 16 and to the A/D converters, if necessary. The outputs of the RAMs drive the output modules 22, 23 via the switching unit 21 and the D/A converter unit 25. In other words, the video rate RAMs provide for an on-line real time interface between, for example, video sources (camera number one and camera number two) and the output destination 22', for example, monitor number one. In addition, processor CPU 27 has access to the data and address inputs and the data outputs of the RAMs either for loading them, error checking or making a modification of their contents.

Synchronization circuits (not shown) provide for proper synchronizing of signals to, for example, create a standard NTSC raster scan for both input and output modules. CPU 27 includes a long term memory 28 which includes both disk and RAM memory and a ROM memory, an input keyboard 29, a display unit 31 and an additional program or function memory 32 (which may be part of memory 28) which contains several special effects functions, some of which are listed.

In addition to the mathematically fundamental standard functions illustrated and the other standard functions provided, created functions, which are a mathematical composition of the standard functions or previously created functions, may be stored in memory 32' (or memory 28).

As will be discussed, the special effects functions are in a special code known as threaded interpretive code. Such a threaded interpretive computer code may be run on computers containing industry standard processors such as the Motorola 6800 or the Digital Equipment Corp. LSI-11, or, for higher performance may be implemented by a commercially available integrated circuit from Novix Corporation with their Model NC4000 integrated circuit. In general, a Forth language is used to execute this code. Other alternative codes may be utilized but it is believed that the threaded code is much more efficient in the context of the present operation.

Figure 2:
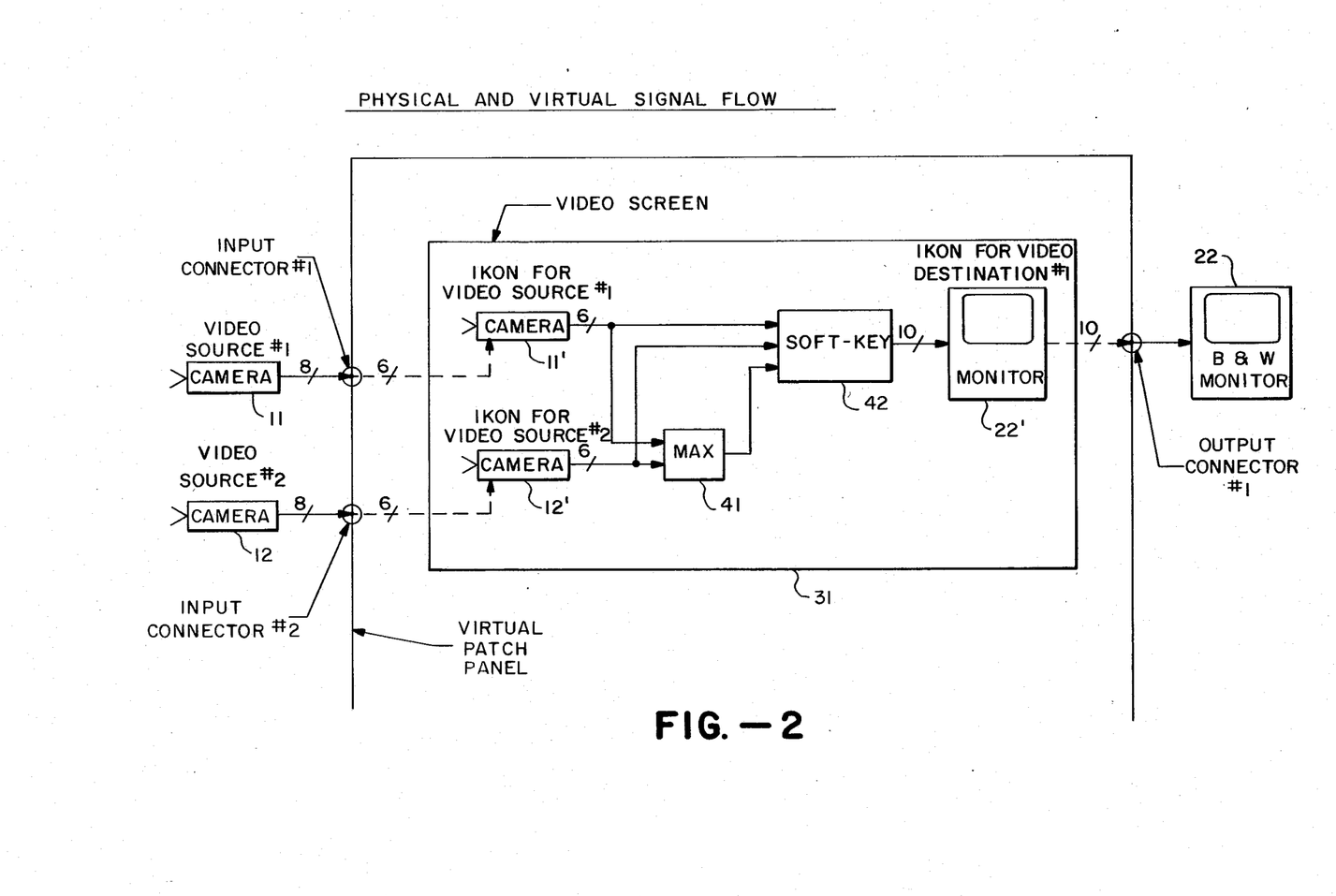
FIG. 2 illustrates a video display screen showing a part of the process of the present invention.

In devising a special effects program, the relationship and bit assignments of both input modules 10 and output modules 20 must be designated. This step, from a programming standpoint, is most conveniently implemented by the use of ikons on a video screen 33 as illustrated in FIG. 2. This would normally be accomplished by the display 31 of FIG. 1 and the use of the input keyboard 29.

To briefly summarize the use of display 31 the user sits in front of this interactive video display screen and manipulates ikons representing processing functions (modules) to create a flow diagram that describes the special effect desired. Special effects are implemented by the specific connection of standard function modules or created function modules. The video screen in addition serves as a virtual patch panel since the connections representing the signal flow between the input source and the processing modules, and the output destination and the processing modules can also be accomplished as will be discussed in detail below.

FIG. 2 illustrates one example of the preferred embodiment of the present invention. Here it is assumed that the input sources to be used are the cameras number one and two and that the video destination is to be the black and white monitor 22. These units are designated by primes since they are ikons or images of the actual units. The connection between the input sources and the processing modules 41 and 42, and in this example "max" and "soft-key," is accomplished both on a hardware level and a software level. On the hardware level as illustrated, the example assumes that the actual bit or bus width of cameras 11 and 12 is 8 bits. Since the digital video input bus in this example is provided only with 12 bits of input, the two least significant bits of each camera must be eliminated.

Figure 2A:
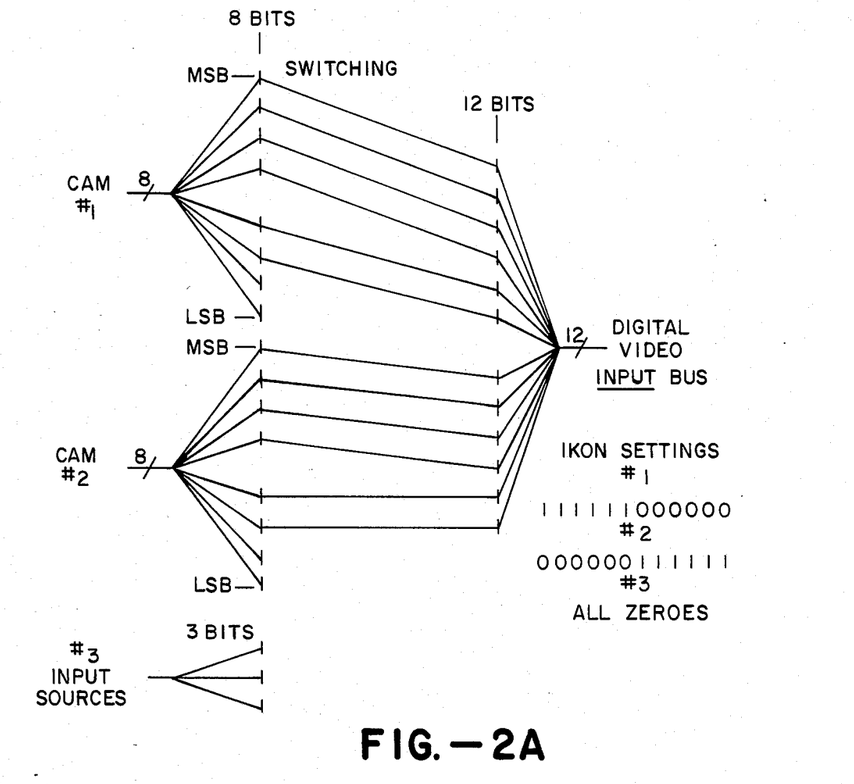
FIGS. 2A and 2B are diagrams illustrating bit assignments for input and output channels.

This is better illustrated in FIG. 2A. Here the last two outputs of each camera are either disconnected or grounded. Then the most significant bits are connected to the digital video input bus as indicated by the two 6 bit lines in FIG. 2 going to the camera ikons 11′ and 12′. Then from a software standpoint, in order to provide the 6 bit output of each camera, which is recognized as the applicable bus width of that camera output, an ikon setting for camera 11′ would activate the first 6 bits and for camera 12′, the last 6 bits. Then supposing there was a third input source shown on the screen, this would be all zeros. Any change in the setting would involve a hardware and software change also if, for example, the number 3 input source as indicated in FIG. 2A was to be added to the 12 bit input bus. In this situation the appropriate physical connection would be made to the 12 bit input bus with bit inputs of cameras number 1 and 2 being correspondingly reduced. Then the ikons from a software point would be set appropriately.

Figure 2B:
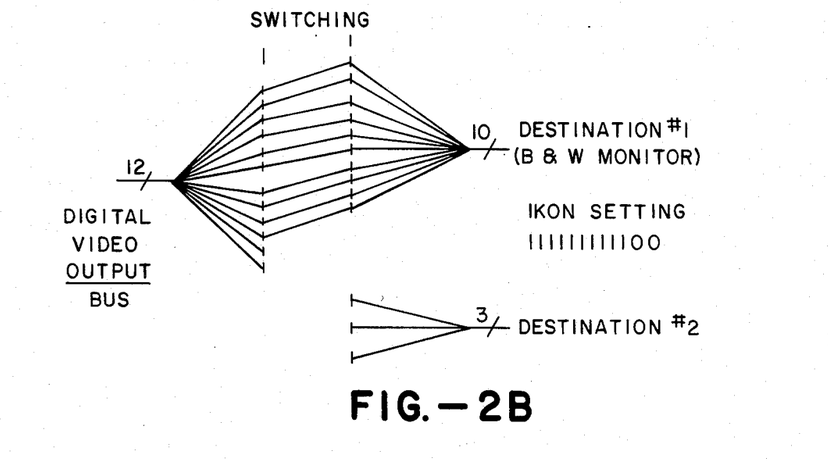

From an output standpoint, and referring to the soft-key output 42 going into the video destination or black and white monitor ikon 22′, it is assumed a 10 bit output is desired. Thus, two bits of the processing system are not used as illustrated in FIG. 2B. Here again, as in the case of the input modules the hardware connection to the black and white monitor 22 as illustrated in FIG. 2 is made on a 10 bit basis and the ikon setting from a software standpoint reflects this, zeros being placed at the two least significant bits of the 12 bit bus. Then destination 2 which is indicated as unused in this configuration could, in the same manner as above, be easily utilized in another configuration without any change in the processing functions.

Figure 6:
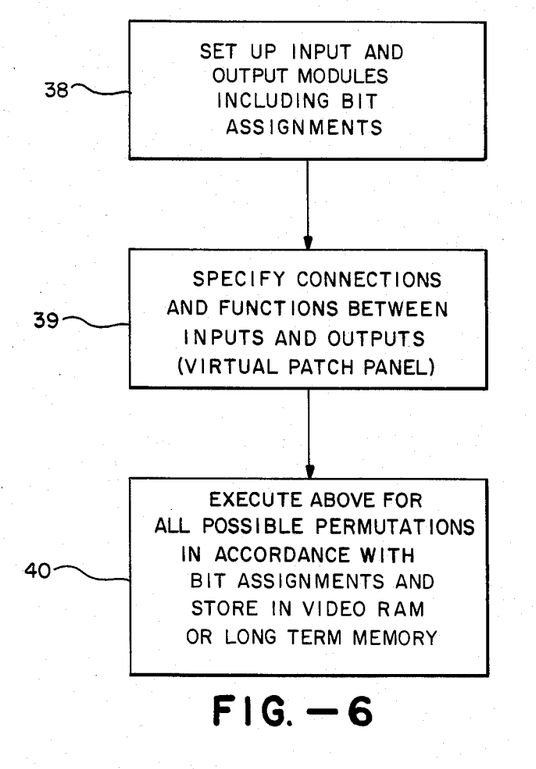
FIG. 6 is a flow chart illustrating the operation of the present invention.

The foregoing initial setup of FIG. 2 is indicated as a programming step 38 in FIG. 6. The next step in the method of the present invention as indicated by step 39 of FIG. 6, is specifying connections and functions between inputs and outputs. From a more detailed standpoint as illustrated on the video screen 31, there is provided a plurality of processing modules each having a predetermined function; in this case the two functions which have been selected from the function memory 32 of FIG. 1 are "max" and "soft-key". After a selection of these modules, the connection between them is made in accordance with the associated function to provide a composition function which determines the special effects desired.

Figure 3:
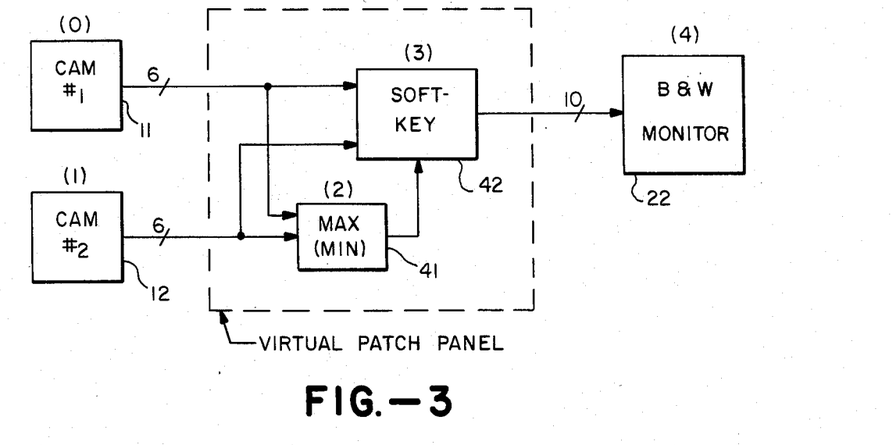
FIG. 3 is a block diagram showing in greater detail the apparatus and process associated with FIGS. 1 and 2.

As illustrated in FIGS. 2 and 3, two functions have been selected; that is "max" and "soft-key" as a typical "special effect." These are indicated as blocks or ikons 41 and 42 respectively. However, it should be understood that they are actually in the form of threaded interpretive computer code and stored in computer memory 32. And, relating the max and soft-key function modules to the above composition of functions, in the example max would be the function $g(x)$, soft-key would be the function $f(x)$, and the resulting composition of functions $f(g(x))$. Since we are dealing with a variety of functions that have various numbers of inputs, instead of just f and g with one input each, we typically have more elaborately structured compositions, in this case: MONITOR (SOFT-KEY
  (CAMERA-1, CAMERA-2, MAX (CAMERA-1, CAMERA-2))). Thus, as indicated in FIGS. 2 and 3 and also, by the manipulation of CPU 27, a virtual patch panel is formed by the user, where, by the use of input keyboard 29 (FIG. 1) the user determines the interconnection of the "max" and "soft-key" functions their inputs, and the final output which is coupled into black and white monitor 22. Therefore, as discussed above, as the user sits in front of the interactive video screen, the ikons are manipulated which represent processing functions to create a flow diagram that describes the special effect which is to be accomplished.

More specifically, the "max" effect is to determine between the respective pixels of camera number one and camera number two, the maximum. This is communicated as an input to "soft-key", specifically to a control input with the other two inputs to the "soft-key" virtual unit 42 being again the video output for camera number one and number two.

In general, "soft-key" provides a weighted sum of the other two inputs based upon its control input. Thus, in general terms, if the control input is black, only one of the two camera inputs will be outputted. On the other hand, if the control input is white, then the other camera input is exclusively outputted. If the control input from the "max" module 38 is in between, then a proportional amount of the signal from cameras number one and two, is outputted.

The following Table I gives an example of the foregoing arrangement where camera number one, which has its output frame illustrated as a five by five table, is a gray scale of vertical bars starting with the left-most bar being black and the right-most white. On the other hand, camera two as shown in the right-hand column, is a gray scale output of horizontal bars, starting with black at the top and white at the bottom. When these two inputs are sensed by the max module 41, the result is shown as "at output of max module." This is actually the control input to the "soft-key" module 42. Then, internal to the "soft-key" module 42 in the first column of Table I, the specific mathematical manipulations are shown as functionally described above. The final output to the black and white monitor 22, which would represent the video display on unit 22, is at the bottom of the first column of Table I.

TABLE I

Numbers represent % on Gray Scale 0 = Black 100 = White

| CAMERA-1 | | | | | CAMERA-2 | | | | |
|---|---|---|---|---|---|---|---|---|---|
| 0 | 25 | 50 | 75 | 100 | 0 | 0 | 0 | 0 | 0 |
| 0 | 25 | 50 | 75 | 100 | 25 | 25 | 25 | 25 | 25 |
| 0 | 25 | 50 | 75 | 100 | 50 | 50 | 50 | 50 | 50 |
| 0 | 25 | 50 | 75 | 100 | 75 | 75 | 75 | 75 | 75 |
| 0 | 25 | 50 | 75 | 100 | 100 | 100 | 100 | 100 | 100 |
| At Output of Max Module | | | | | At Output of Min Module | | | | |
| 0 | 25 | 50 | 75 | 100 | 0 | 0 | 0 | 0 | 0 |
| 25 | 25 | 50 | 75 | 100 | 0 | 25 | 25 | 25 | 25 |
| 50 | 50 | 50 | 75 | 100 | 0 | 25 | 50 | 50 | 50 |
| 75 | 75 | 75 | 75 | 100 | 0 | 25 | 50 | 75 | 75 |
| 100 | 100 | 100 | 100 | 100 | 0 | 25 | 50 | 75 | 100 |
| Max* Camera-2 | | | | | Min* Camera-2 | | | | |
| 0 | 0 | 0 | 0 | 0 | 0 | 0 | 0 | 0 | 0 |
| 6.25 | 6.25 | 12.5 | 18.75 | 25 | 0 | 6.25 | 6.25 | 6.25 | 6.25 |
| 25 | 25 | 25 | 37.5 | 50 | 0 | 12.5 | 25 | 25 | 25 |
| 56.25 | 56.25 | 56.25 | 56.25 | 75 | 0 | 18.75 | 37.5 | 56.25 | 56.25 |
| 100 | 100 | 100 | 100 | 100 | 0 | 25 | 50 | 75 | 100 |
| (1 - Max) | | | | | (1 - Min) | | | | |
| 100 | 75 | 50 | 25 | 0 | 100 | 100 | 100 | 100 | 100 |
| 75 | 75 | 50 | 25 | 0 | 100 | 75 | 75 | 75 | 75 |
| 50 | 50 | 50 | 25 | 0 | 100 | 75 | 50 | 50 | 50 |
| 25 | 25 | 25 | 25 | 0 | 100 | 75 | 50 | 25 | 25 |
| 0 | 0 | 0 | 0 | 0 | 100 | 75 | 50 | 25 | 0 |
| (1 - Max)* Camera-1 | | | | | (1 - Min)* Camera-1 | | | | |
| 0 | 18.75 | 25 | 18.75 | 0 | 0 | 25 | 50 | 75 | 100 |
| 0 | 18.75 | 25 | 18.75 | 0 | 0 | 18.75 | 37.5 | 56.25 | 75 |
| 0 | 12.5 | 25 | 18.75 | 0 | 0 | 18.75 | 25 | 37.5 | 50 |
| 0 | 6.25 | 12.5 | 18.75 | 0 | 0 | 18.75 | 25 | 18.75 | 25 |
| 0 | 0 | 0 | 0 | 0 | 0 | 18.75 | 25 | 18.75 | 0 |
| Sum - Output of Soft-Key Module with Max Module in Patch | | | | | Sum - Output of Soft-Key Module with Min Module in Patch | | | | |
| 0 | 18.75 | 25 | 18.75 | 0 | 0 | 25 | 50 | 75 | 100 |
| 6.25 | 25 | 37.5 | 37.5 | 25 | 0 | 25 | 42.75 | 62.5 | 81.25 |
| 25 | 37.5 | 50 | 56.25 | 50 | 0 | 31.25 | 50 | 62.5 | 75 |
| 56.25 | 62.5 | 68.75 | 75 | 75 | 0 | 37.5 | 62.5 | 75 | 81.25 |
| 100 | 100 | 100 | 100 | 100 | 0 | 42.75 | 75 | 93.75 | 100 |

As will be described in greater detail below, the virtual patch panel may be easily modified so that module 41 performs a "min" function rather than "max." In other words, a minimum of the values of camera number one and number two is chosen as shown in Column 2 of Table I, the second row. And, in a similar manner, at the bottom of Column 2, the final input to the black and white monitor 22 is illustrated.

Theoretically, the virtual patch panel of FIGS. 2 and 3 could be implemented in hardware or, in other words, patched together as is done with modules of, for example, a music synthesizer. However, there would be no flexibility and a large hardware inventory would be necessary. Also, the need to conform to applicable regulations for emission of radio frequency interference in such a system of patch programmable hardware modules, would, in view of the high frequencies of the video circuits, require expensive and possibly impractical shielded packaging. Even assuming use of such logic, if it were desired to change, for example, the functions from "max" to "min" as suggested in FIG. 3, a totally new hardware module would have to be provided.

The present invention provides a much more flexible mode of operation by, in effect, providing the special effects functioning via software only. As shown in FIG. 6 at step 40, once the functional connections are specified, these are executed in software for all possible values of the permutations of the inputs from camera number one and number two and then stored in the video RAM 24 for actual use. Alternatively, such pre-computation may be stored in a long term memory such as memory 28 (FIG. 1).

Then to continue the operation and the actual execution of the special effect and referring to FIG. 1, when the value of the permutation occurs with respect to cameras number one and number two, this twelve bits of information (in the specific example) addresses the video rate RAM 24. At that address has been stored the output value which relates to that specific input value. This is immediately outputted and changed to analog form to drive monitor 22. Thus, on an on-line basis, by the use of the video rate RAM which has stored in it the pre-computed value of the input sources 11 and 12, a special effect is immediately provided. The reason that this can be done on an on-line basis is because of the pre-computation of the special effect by the CPU processor 27 which will be discussed in detail below.

Figure 6A:
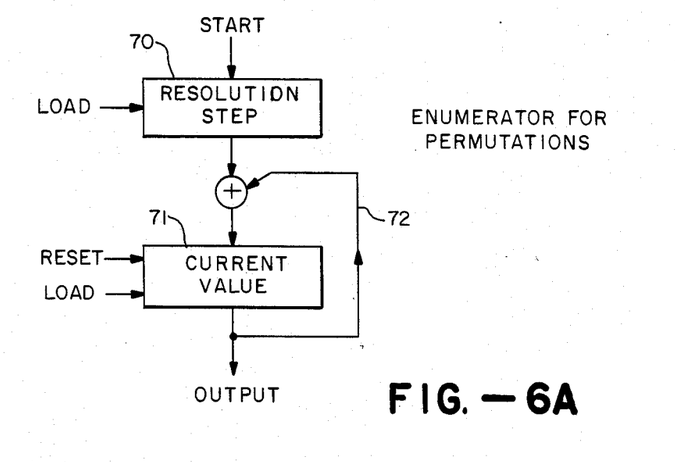
FIG. 6A is a flow chart illustrating a subroutine of FIG. 6.

The pre-computation, as discussed above, is accomplished by sequencing through possible permutations of the input sources. One manner in which this may be accomplished is illustrated in FIG. 6A which is a flow chart illustrating an enumerator for permutations. Here in step 70, the resolution is set. For example, the permutations may be 64 grey levels. In the initializing step 71, designated "current value," there is a reset to a starting value. The current value is determined and by the loop 72 this is added to the next resolution step to thus increment and provide in the end the various permutations.

From an operational point of view, it should be mentioned, for example, that if a "min" module 41 (FIG. 3) is desired that this overall special effect could be stored in video rate RAM 26 and could be immediately switched to, if desired. With the present invention and with the storage of several pre-computed special effects in memory 28 and the use of multiple video RAMs, for example, 24 and 26, there need be no time lag for implementation of any type of a change from one type of special video effect to another. Moreover, because of the pre-computation of video effects, and since they are computed off-line, they can be relatively complex.

However, since the pre-computation of special effects for example in a television broadcasting studio, is often done on an ad hoc basis, the present invention also provides for this pre-computation in a relatively brief period of time. For example, if some simple changes are made, such pre-computation might be done within a vertical blanking interval. This is in general accomplished by the use of a threaded interpretive code.

Figure 4:
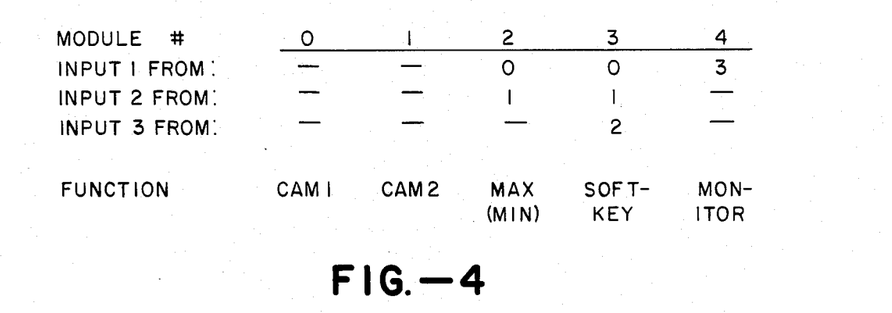
FIG. 4 is a table used in conjunction with FIG. 3.
Figure 5:
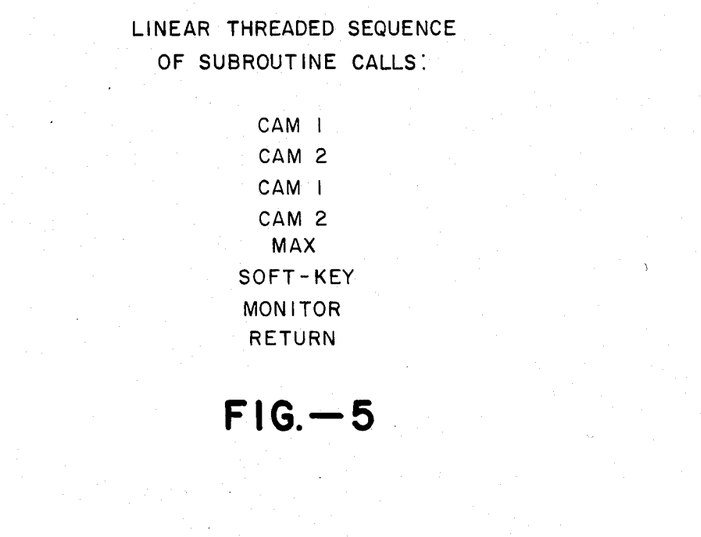
FIG. 5 is a sequence of subroutine calls constituting a computer program used in practicing the invention.

Now referring to FIG. 4, to provide the pre-computation of the special effects, a table is set up by the use of CPU 27 which shows the various module functions and the input connections. Thus the table of FIG. 4 lists the modules 0, 1, 2, 3, 4 (these are designated in FIG. 3 also) with their function. And then for each module, their inputs are listed. Naturally, the input sources of camera number one and number two designated modules 0 and 1, have no inputs for the present purposes. However, there is a first input to module 4 which is listed as module 3, the "soft-key" module. Then the output from module 1, actually camera number two, is an input to both modules 2 and 3, ("max" and "soft-key") as plainly illustrated in FIG. 3. Lastly, there is a third input from the "max" module to "soft-key" and this is so designated. With the use of the table of FIG. 4, a linear threaded sequence of subroutine calls may be set up as illustrated in FIG. 5. This is listed with the functions of the various modules involved in the example of FIG. 3.

The rule for setting up this threaded sequence is as follows:

For each input, in order, call yourself;
add name of function associated with this module to end of program being generated.

With the foregoing, the sequence of subroutine calls of FIG. 5 is provided. The sequence of subroutine calls is gone through for each possible value of the permutations of both input sources 11 and 12. See the above discussion of FIG. 6A showing the enumerator for permutations. This is accomplished given a bit width of six for each of the input sources, 64 times 64 or 4,096 times. By the use of a threaded interpretive code operating on a parameter stack, such subroutine calls are implemented in a very quick period of time.

Figure 7:
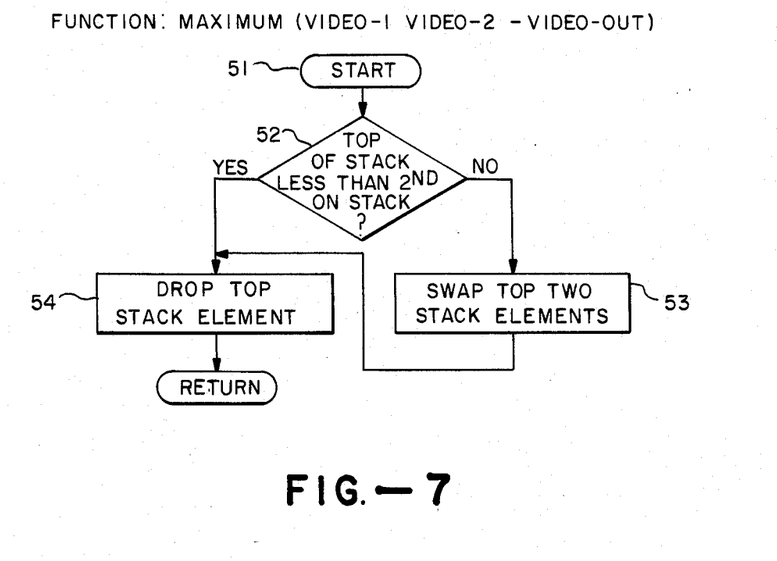
FIGS. 7 through 12 are flow charts of functions shown in FIG. 1 and constitute the subroutines which are executed as illustrated in FIG. 5.
Figure 8:
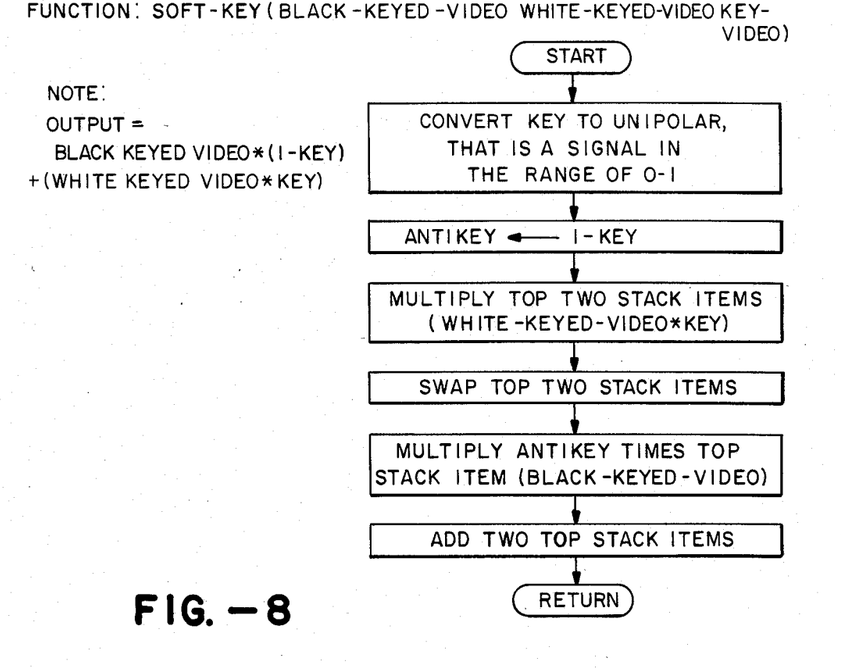
Figure 9:
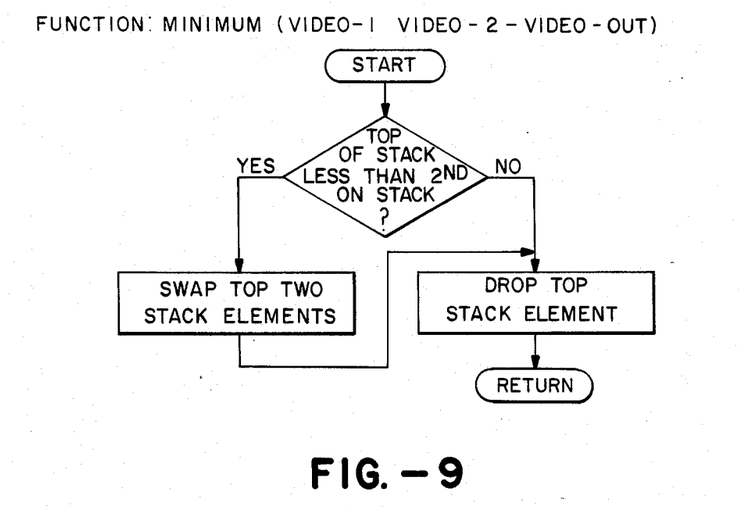
Figure 10:
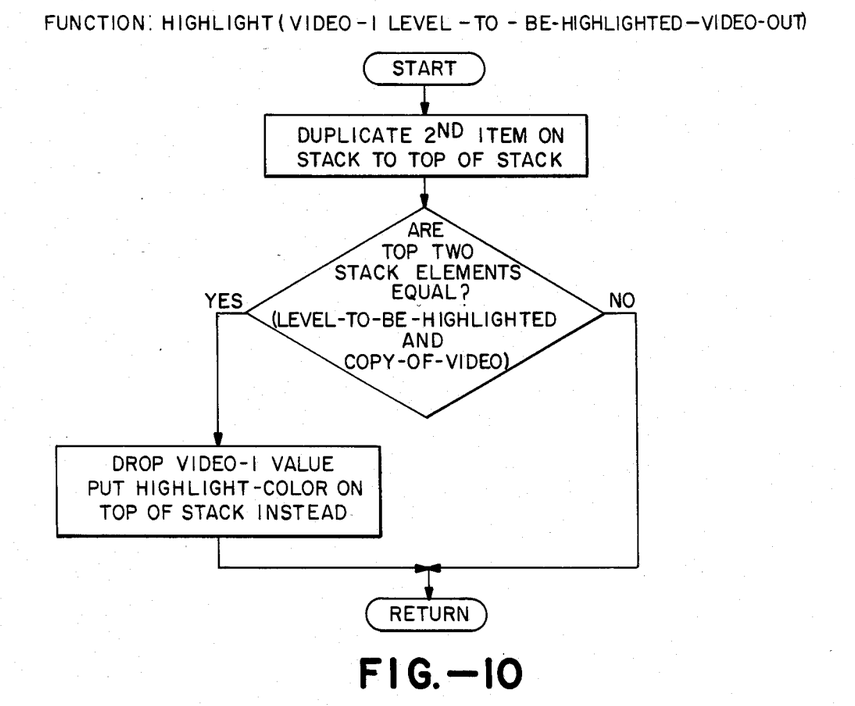
Figure 11:
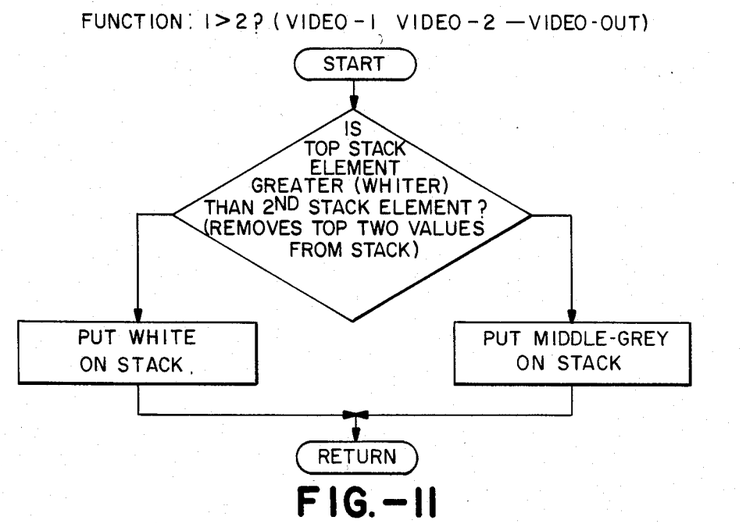
Figure 12:
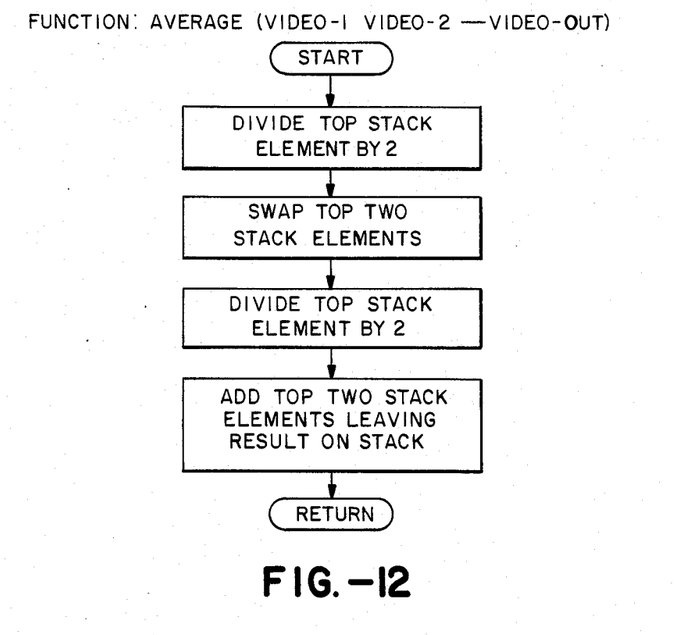

Very specifically, FIGS. 7 through 12 indicate the use of the parameter stack by the threaded interpretive code for, in the case of FIG. 7, computing a maximum; FIG. 8, soft-key; FIG. 9, minimum; FIG. 10, highlight; FIG. 11, a greater function; and FIG. 12, an average function. With respect to FIG. 7, a typical program begins with the start 51 and then the question 52 is the top of stack less than the second on stack. If yes, as indicated in step 53, the top stack element is dropped. If no, then as indicated in step 54, they are switched or swapped. Then a return is made. With the use of such a parameter stack technique the needed input is always at the top of the stack and thus speed of operation of the execution of the code is vastly facilitated.

In general, the description of a threaded interpretive code and the use of parameter stacks is described in an article entitled "An Architectural Trail to Threaded-Code Systems" by Peter M. Kogge in the March 1982 computer section bulletin of the IEEE.

FIG. 8 shows the stack program for the "soft-key" module 42 which can be correlated with the steps illustrated in Table I. The remaining functions of minimum, highlight, greater than and average are also apparent.

In operation it is quite apparent that the above pre-computation can be accomplished off-line and then the results stored, for example, in the alternate video rate RAM 26 (FIG. 1) while the first video rate RAM 24 is actually executing its special effect with inputs from the two cameras 11 and 12 or for that matter, any of the other inputs. Thus, the pre-computation does not slow the special effects technique. Also very complex composition of functions can be done. At the same time, because of this pre-computation, several special effects can be quickly devised, stored and then executed, even on a line-to-line basis of a video raster.

Figure 13:
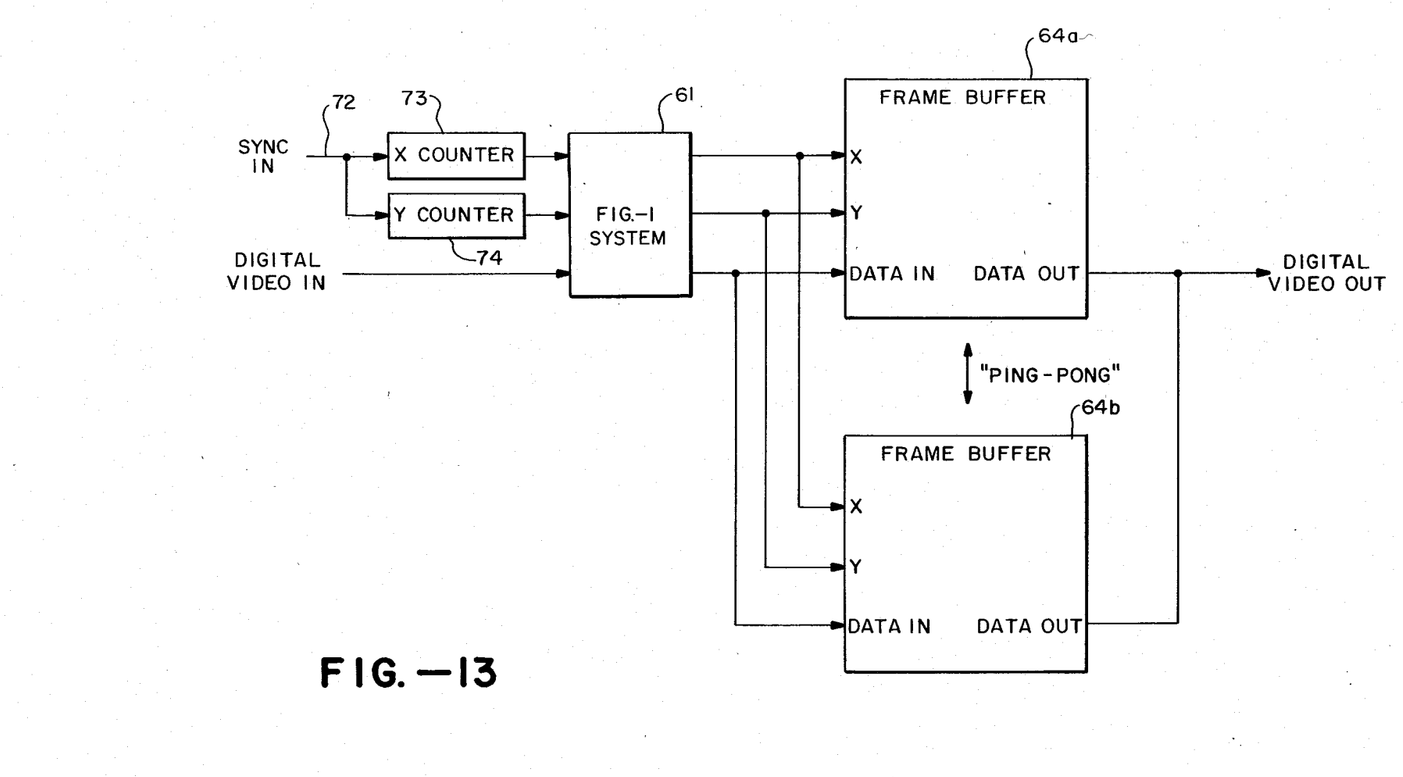
FIG. 13 is a block diagram of an alternative embodiment of the present invention.

For example, FIG. 13 shows an alternative implementation where the system of FIG. 1 configured for three channels is utilized, one for the "X" input of a video raster, one for the "Y" input and a third for color or gray scale otherwise designated in general as a digital video input. Specifically, as illustrated in FIG. 13 a synchronizer on line 72 drives X-counter 73 and Y-counter 74 which in turn drive the first two input channels of the FIG. 1 system designated 61. And then the "digital video" in drives the third FIG. 1 input channel. All of these inputs are then input to X and Y inputs of a typical video frame buffer 64a where in effect the entire frame of a video picture is stored. There is a data out terminal 76 of the frame buffer to provide the digital video out. In order to provide for a continuous read out of successive frames, an alternate buffer 64b is connected in parallel to provide a "ping-pong" effect; while one frame buffer is being written into the other is being read out on the digital video out line 76.

Figure 14:
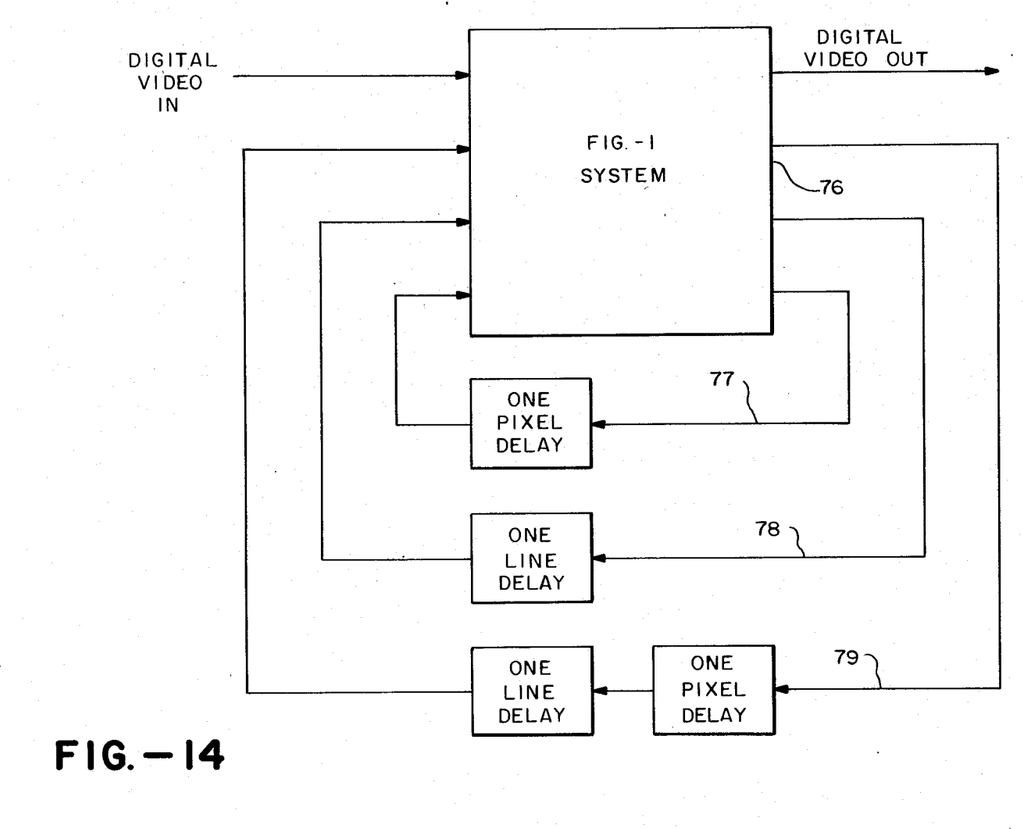
FIG. 14 is a block diagram of yet another alternative embodiment of the present invention.

As should be obvious to one skilled in the art, the invention of FIG. 1 can be used in conjunction with digital delay elements. One example of this is shown in FIG. 14 which depicts a four input channel, four output channel version 76 of the FIG. 1 system. Three feedback paths 77, 78 and 79 are provided between outputs and inputs. Path 77 has a digital delay of one pixel, path 78 one video line, and path 79 one pixel plus one video line. Such a system can do 2×2 convolution kernel processing on a real time video image with details of the convolution function constructed through the methodology of the invention. In effect this is a higher class of functions.

Finally, a generalized digital filter element can be fabricated. Here multiple versions of the FIG. 1 system are used to provide the processing power of the composition of functions approach at various points in a digital signal processing network.

The above example of FIGS. 2–5, for pedagogical purposes, illustrated the methodology of the invention through a particular example. It is appropriate to note certain additional points not brought out by this particular example.

While only one processing module associated with, for example, a "MAX" function was shown, a plurality of processing modules of the same function are provided for each such function present in the system. While only one or two layers of processing modules were, in the example, connected between the input modules and the output modules, the plurality of processing modules provided allows much more complicated arrangements and networks to be conveniently implemented.

After creating an effect, the operator still has several options. The operator could alter the bit assignments of the input or output channels to see the same effect but with a different number of steps in the gray scale (smoothness). Or, if these bit assignments were to be left constant, perhaps to reflect the best use of the current attached video equipment, the operator could create other effects working within this assignment of input and output channels by changing the arrangement, function, and/or number of active processing function modules.

Another aspect of the invention that was described specifically but should be seen in a general light is that the example described shows how the system is used to process the gray level of a video signal. As should be obvious to one skilled in the art, this same methodology for applying a composition of functions to a high speed digital signal can be used in a variety of contexts. Multiple channels can be used to process color information in, for example, an RGB (3 channel) or an RGBA (4 channel) configuration. This methodology is not limited to processing color information; it can also alter the spatial position of video signals by processing X and Y position signals as in FIG. 13. It can also be used to process high speed signals used for other purposes.

While the example describes a configuration that provides 12 bits of input bus and 10 bits of output bus, other bit widths are conveniently provided based on straightforward economic considerations.

The following Table II is a summary of examples of functions from each major category.

TABLE II

| | |
|---|---|
| INPUT: | |
| CAMERA | (Video rate input) |
| KNOB or PORT | (Computer rate input) |
| OUTPUT: | |
| B+W-MONITOR | (Single output channel) |
| RGB-MONITOR | (3-primary color output channel) |
| HSV-MONITOR | (Color output with color rematrixing) |
| XY-DATA-OUTPUT | (For frame buffer spatial processing) |
| PROCESSING: | |
| NEGATIVE | (converts a signal to its video negative) |
| MIN | (picks pixel with gray value closest to black) |
| MAX | (picks pixel with gray value closest to white) |
| MULTIPLY | (mathematically multiplies two pictures) |
| BETWEEN | (defines region of picture between two gray levels) |
| < | (defines region where picture #1 is darker than #2) |
| > | (defines region where picture #1 is lighter) |
| SOFT-KEY | (smooth weighted combination of two pictures under control of a third) |
| COS | (trigonometric shaping) |
| AVERAGE | (mathematical average of two pictures) |
| DIFFERENCE | (mathematical difference of two pictures) |
| HIGHLIGHT | (designated gray level in picture is replaced by highlight color) |
| DISPLAY: | |
| GRAPHER | appears on patch panel screen and draws on display 31 a graphic representation of signal passing through it. |

TABLE II-continued

An important concept of the present invention, as best illustrated in FIG. 1, is the separate storage of the various standard functions listed in memory 32 and the created functions 32' as a high level description in the form of a generalized computer code format and specifically, of the threaded interpretive type. Functions stored in this manner thus transcend specific input and output channel bit assignments. Other systems in the prior art do not store composition of functions models and hence cannot extend the same effect to the different bit widths of input and output channels.

In the present invention the pre-computation step 40 (see FIG. 6) utilizes the generalized computer code format that has been stored for the composition of functions in combination with the specified bit assignments to thus provide by the pre-computation a special effects function specific to the particular input or output channel bit assignments and channel bit widths. Thus, the foregoing allows an object of the present invention to be accomplished where the special effect is designed independent of the bit widths or assignments of input-output channels.

It follows that new special effects functions can be developed by the composition of function modules already in the system library by the use of the generalized computer code format (the threaded interpretive code) and these newly created functions are then added to the system's library of functions 32'. These created function modules can then be used on the same basis as the standard function modules. This includes use as processing modules for special effects, as well as being building blocks used in the definition of even more complicated created function modules.

Thus, very complex special effects can be provided by the present invention on an on-line basis. In addition there is great flexibility in modifying or changing the type of video effect desired as discussed above.

Thus, a general purpose video special effects system and method has been provided.

What is claimed is:

1. A general purpose video special effects system and method using random access memory (RAM) means in combination with one or more input sources, at least one being a video source, and with at least one video output destination comprising the steps of:
   providing a plurality of processing modules each having a predetermined function;
   connecting said modules in accordance with said associated functions to provide a composition of functions which determines said special effects;
   specifying connections representing signal flow between said input source and said processing modules and said output destination and said processing modules;
   pre-computing said special effects for substantially all possible values of permutations of said input sources;
   storing said pre-computations in said RAM means at addresses determined by said values of said input sources; and
   allowing said input sources to drive the address inputs of said RAM and read out said stored pre-computation contents of said RAM, in real time, to said video output destination.

2. A method as in claim 1 including the step of pre-computing a plurality of special effects and storing in an off-line memory.

3. A method as in claim 1 where said pre-computing is accomplished by use of a threaded interpretive computer code.

4. A method as in claim 3 where said code operates on a parameter stack.

5. A method as in claim 1 including the step of, concurrent with the step of said input sources driving said RAM, pre-computing another of said special effects.

6. A method as in claim 1 including the step of changing a said function of a said module.

7. A method as in claim 1 where said connecting and specifying steps are accomplished by use of a video screen displaying ikons of said modules, sources and destinations.

8. A method as in claim 1 where at least one television type frame buffer, having X (horizontal), Y (vertical) and video level inputs, drives a standard raster scan television receiver including the steps of providing a said RAM driven by said X, Y and video level inputs with the outputs of said RAM driving corresponding inputs of said frame buffer.

9. A method as in claim 1 including a long term memory and the steps of storing a plurality of said pre-computations, and selectively updating said RAM means with said stored pre-computations.

10. A method as in claim 1 where said pre-computing step includes determining a resolution step and then incrementing.

11. A method as in claim 1 where said step of providing a plurality of processing modules each having a predetermined function includes the step of storing these functions in memory in a generalized computer code format.

12. A method as in claim 11 where said code format is of the threaded interpretive type.

13. A method as in claim 11 including the step of creating a processing module with a new function by using previously stored functions to form a said composition of functions and then storing said composition as said new function.

14. A method as in claim 1 where said specifying connections step includes the step of specifying digital bit assignments for said input source and output destination.

15. A method as in claim 11 where said specifying connections step includes the step of specifying digital bit assignments for said input source and output destination and where said pre-computing step utilizes said generalized computer code format in combination with said specified bit assignments to sequence through said permutations.

16. A method as in claim 1 including the step of feeding back via a digital delay said video output destination to a said input source.

* * * * *